US012773828B2

(12) United States Patent
Unger et al.

(10) Patent No.: US 12,773,828 B2
(45) Date of Patent: Oct. 27, 2026

(54) UD TAPE WITH IMPROVED PROCESSING CHARACTERISTICS AND METHOD FOR PRODUCTION THEREOF

(71) Applicants: Toray Advanced Composites, Morgan Hill, CA (US); Toray Advanced Composites, Nijverdal (NL)

(72) Inventors: Scott Unger, Morgan Hill, CA (US); Dan Leeser, Morgan Hill, CA (US); J.W. Luinge, Nijverdal (NL)

(73) Assignee: Toray Advanced Composites, Nijverdal (NL)

( * ) Notice: Subject to any disclaimer, the term of this patent is extended or adjusted under 35 U.S.C. 154(b) by 394 days.

(21) Appl. No.: 18/043,329

(22) PCT Filed: Aug. 25, 2021

(86) PCT No.: PCT/EP2021/073527

§ 371 (c)(1),
(2) Date: Feb. 27, 2023

(87) PCT Pub. No.: WO2022/043391

PCT Pub. Date: Mar. 3, 2022

(65) Prior Publication Data

US 2023/0278295 A1 Sep. 7, 2023

(30) Foreign Application Priority Data

Aug. 28, 2020 (EP) .................................... 20193384

(51) Int. Cl.

| | |
|---|---|
| ***B29C 70/08*** | (2006.01) |
| ***C08J 5/04*** | (2006.01) |
| *B29K 71/00* | (2006.01) |
| *B29K 79/00* | (2006.01) |
| *B29K 81/00* | (2006.01) |
| *B29K 105/10* | (2006.01) |

(52) U.S. Cl.

CPC .......... *B29C 70/086* (2013.01); *B29C 70/083* (2013.01); *C08J 5/0405* (2021.05); *C08J 5/042* (2013.01); *C08J 5/043* (2013.01); *B29K 2071/12* (2013.01); *B29K 2079/085* (2013.01); *B29K 2081/04* (2013.01); *B29K 2081/06* (2013.01); *B29K 2105/105* (2013.01); *C08J 2361/04* (2013.01); *C08J 2365/00* (2013.01); *C08J 2371/00* (2013.01); *C08J 2371/12* (2013.01); *C08J 2379/08* (2013.01); *C08J 2381/02* (2013.01); *C08J 2381/06* (2013.01)

(58) Field of Classification Search

None

See application file for complete search history.

(56) References Cited

U.S. PATENT DOCUMENTS

| | | | | |
|---|---|---|---|---|
| 2011/0230112 | A1* | 9/2011 | Rose | D04H 1/587 28/107 |
| 2014/0377556 | A1 | 12/2014 | Boursier | |
| 2015/0166743 | A1 | 6/2015 | Restuccia et al. | |
| 2015/0375461 | A1 | 12/2015 | Blackburn et al. | |
| 2016/0082691 | A1 | 3/2016 | Restuccia et al. | |
| 2016/0340462 | A1* | 11/2016 | Mathew | C08F 292/00 |
| 2017/0334094 | A1* | 11/2017 | Pellet | B29B 15/12 |
| 2018/0186951 | A1* | 7/2018 | Kalyanaraman | C08J 3/14 |
| 2022/0041825 | A1* | 2/2022 | Lenzi | C08G 73/1067 |
| 2022/0195134 | A1* | 6/2022 | Oda | C08J 5/243 |
| 2023/0295377 | A1* | 9/2023 | Thomas | C08G 73/1032 528/368 |

FOREIGN PATENT DOCUMENTS

| | | | |
|---|---|---|---|
| EP | 3124458 | A1 | 2/2017 |
| EP | 3393738 | A1 | 10/2018 |
| WO | 2020-132663 | A1 | 6/2020 |

OTHER PUBLICATIONS

HexTow® AS4 Carbon Fiber—Product Data Sheet (2020). Retrieved from https://www.hexcel.com, as archived on https://web.archive.org/ (Year: 2020).*
International Preliminary Report on Patentability mailed on Mar. 9, 2023 in International Patent Application No. PCT/EP2021/073527, 8 pages.
International Search Report and Written Opinion mailed on Mar. 1, 2022, in International Patent Application No. PCT/EP2021/073527, 11 pages.

* cited by examiner

*Primary Examiner* — Jose I Hernandez-Kenney
(74) *Attorney, Agent, or Firm* — Kilpatrick Townsend & Stockton LLP

(57) ABSTRACT

The present invention concerns Method for producing a unidirectional tape, the method comprising the steps of a) providing an impregnation slurry comprising primary particles and secondary particles, water, optionally an organic carrying medium, optionally an organic compound and optionally a surface active compound, and providing a unidirectional fiber layer having an average interstitial filament distance, wherein the primary particles comprise a first polymer and the primary particles have a particle size equal to or smaller than the average interstitial filament distance, and the secondary particles comprise a second polymer and the secondary particles have a particle size larger than the average interstitial filament distance, b) impregnating the unidirectional fiber layer with the impregnation slurry to form an impregnated unidirectional fiber web comprising an impregnated unidirectional fiber layer and a surface polymer layer, wherein the impregnated unidirectional fiber layer comprises, preferably consists of, the unidirectional fibers and the primary particles, and the surface polymer layer comprises the secondary particles, c) drying the impregnated unidirectional fiber web to obtain a unidirectional tape.

13 Claims, No Drawings

UD TAPE WITH IMPROVED PROCESSING CHARACTERISTICS AND METHOD FOR PRODUCTION THEREOF

This application is a National Phase of PCT/EP2021/073527, titled "UD TAPE WITH IMPROVED PROCESSING CHARACTERISTICS AND METHOD FOR PRODUCTION THEREOF", filed Aug. 25, 2021 which claims priority to EP application Ser. No. 20193384.3, titled "UD TAPE WITH IMPROVED PROCESSING CHARACTERISTICS AND METHOD FOR PRODUCTION THEREOF", filed Aug. 28, 2020, which are hereby incorporated by reference herein in their entireties.

The present invention relates to a thermoplastic UD tape with improved processing characteristics and a method for production thereof.

Unidirectional tapes ("UD tapes") are fiber-reinforced tapes of different widths and are known for many years. Unidirectional aligned reinforcing fibers are typically impregnated with thermoplastic polymers, whereby the reinforcing fibers are usually carbon fibers or glass fibers. UD tapes can be used to make structures having advantageous structural characteristics, such as high stiffness and high strengths as well as low weights, when compared to structures formed from other conventional materials. As a result, UD tapes are used in a variety of applications across a wide range of industries, including the automotive, aerospace and consumer electronics industries. Depending on its application, a UD tape may need to meet a number of criteria, including those relating to mechanical performance such as strength or stiffness, size, weight as well as good processability and formability into complex shapes.

Subsequent processing of UD tapes typically encompasses melting of the thermoplastic polymer present in UD tapes to build up a coherent stack or a laminate of multiple plies. These processes include tacking, tape placement, tape laying, consolidation and welding. Most processes thus require the melting and interdiffusion of the thermoplastic polymer present at the interface of adjacent UD tapes so as to form a fully consolidated laminate.

Improved processing capabilities are sought for in the art for UD tapes. Such improved processing capabilities means fast deposition, consolidation characteristics, thermoforming behaviour and lateral flow for complex shapes. At the same time, the UD tape shall have good mechanical properties such as toughness and stiffness. Furthermore, specific applications, such as in the aerospace sector, additionally require good electrical conductivity and/or thermal conductivity of UD tapes. Other specific applications require, in turn, the UD tape to have electrically insulating properties.

There is thus a need in the art to provide UD tapes having improved processing capabilities and at the same time good mechanical properties.

There is also a need in the art to provide UD tapes having improved processing capabilities, good mechanical properties and at the same time good electrical conductivity and/or thermal conductivity.

There is also a need in the art to provide UD tapes having improved processing capabilities, good mechanical properties and at the same time good electrical insulating properties.

It is thus an object of the invention is to provide a UD tape having improved processing capabilities and at the same time good mechanical properties.

It is a further object of the present invention to provide a UD tape having fast deposition, improved consolidation characteristics, improved thermoforming behaviour and improved lateral flow for complex shapes and at the same time toughness and stiffness.

It is a further object of the present invention to provide a UD tape having improved processing capabilities, good mechanical properties and at the same time good electrical conductivity and/or thermal conductivity.

It is a further object of the present invention to provide a UD tape having improved processing capabilities, good mechanical properties and at the same time insulating properties.

It is also an object of the present invention is to provide a method for producing a UD tape having these properties.

It has been surprisingly found that all the above objects can be solved by a method for producing a UD tape having a layer of polymer at the surface of the unidirectional fiber layer. In other words, a UD tape is produced having a surface polymer layer on the unidirectional fiber layer, wherein the surface polymer layer provides for the improved processability and the unidirectional fiber layer provides for the improved mechanical properties.

It has been further surprisingly found that by functionalising this surface polymer layer the properties of the UD tape can be tuned in terms of electrical conductivity and/or in terms of insulating properties. Functionalising means that components other than polymer are incorporated into the surface polymer layer so as to provide specific properties to the surface polymer layer.

The present invention therefore provides a method for producing a unidirectional tape, the method comprising the steps of a) providing an impregnation slurry comprising primary particles and secondary particles, water, optionally an organic carrying medium, optionally an organic compound and optionally a surface active compound, and providing a unidirectional fiber layer having an average interstitial filament distance,
   wherein either
   (i) the primary particles have a particle size equal to or smaller than the average interstitial filament distance and the secondary particles have a particle size larger than the average interstitial filament distance, and/or
   (ii) the primary particles have a particle size of 10 to 50 μm and the secondary particles have a particle size of 51 to 500 μm,
b) impregnating the unidirectional fiber layer with the impregnation slurry to form an impregnated unidirectional fiber web comprising an impregnated unidirectional fiber layer and a surface polymer layer, wherein the impregnated unidirectional fiber layer comprises, preferably consists of, the unidirectional fibers and the primary particles, and
   the surface polymer layer comprises the secondary particles,
c) drying the impregnated unidirectional fiber web to obtain a unidirectional tape.

The present invention further provides a unidirectional tape obtained by the method according to the invention.

The present invention further has several surprising advantages.

The polymer of the surface polymer layer can be similar, identical or can be different to the polymer within the unidirectional fiber layer to further optimize mechanical and/or processing performance of the UP tape. This is achieved by tailoring the properties of both the surface polymer layer and the unidirectional fiber layer at the same time.

For example, the surface polymer layer can be tailored to have e.g. increased lateral flow, thereby obtaining improved processability of the UD tape. At the same time the mechanical properties of the UD tape can be tailored by selecting appropriate fibers and/or an appropriate polymer for the unidirectional fiber layer.

Furthermore, due to formation of the surface polymer layer an increased polymer content is present at the surface of the UD tape which, in turn, decreases friction between plies and between tooling and composite stacks. The decreased friction increases the formability of the tape and allows for faster forming and/or forming of more complex shapes.

Furthermore, the invention further allows to functionalise this surface polymer layer and thus to fine tune the properties of the UD tape. Functionalising means that other components than polymer are incorporated into the surface polymer layer to provide specific properties to this surface polymer layer. These specific properties can be electrical conductivity or insulating properties. This functionalisation can be readily obtained by the method of the invention.

The method for producing a unidirectional tape (UD tape) according to the invention is described in more detail in the following.

In step a) a unidirectional fiber layer having an average interstitial filament distance is provided.

The unidirectional fiber layer comprises unidirectional fibers. These unidirectional fibers are generally arranged to lie in a unidirectional orientation. In other words, the plurality of fibers generally lie parallel to each other. Preferably, at least 75% of the fibers of the unidirectional fiber layer lie in a unidirectional orientation, more preferably at least 80%, even more preferably at least 90%, and most preferably at least 95%. The unidirectional fibers comprise or consist of filaments. The number of filaments which form a fiber can vary. Typically, a unidirectional fiber may be formed from 12000 or 24000 filaments. The diameter of a filament is typically 5 to 7 μm.

The average interstitial filament distance between adjacent filaments of the unidirectional fiber layer is preferably 40 to 60 μm, more preferably 45 to 55 μm, more preferably 47 to 52 μm, more preferably 49 to 51 μm, and most preferably 50 μm.

The average interstitial filament distance of the unidirectional fiber layer is measured before impregnating the unidirectional fiber layer. The average interstitial filament distance of the unidirectional fiber layer can be adjusted, for example, by using a gripping or pulling device which is commonly used in pultrusion processes. The gripping or pulling device can for example be a rotating mandrel. The gripping or pulling device keeps the unidirectional fibers under tension while performing the method of the invention. The average interstitial filament distance of the unidirectional fiber layer can thus be adjusted by varying the tension on the fibers applied by the gripping or pulling device.

The method of the invention is preferably conducted as pultrusion process.

The average interstitial filament distance can, for example, be determined by an optical microscope. The interstitial filament distance is measured between adjacent filaments of a fiber at least three times on at least five fibers, and the average interstitial filament distance is calculated as the arithmetic mean thereof.

The unidirectional fiber layer has two opposite surfaces, a first surface and a second surface. The polymer surface layer is formed either on the first surface or on the second surface, or a surface polymer layer is formed on both the first and second surface.

The impregnation slurry used in the method of the invention comprises primary particles and secondary particles, water, optionally a surfactant, optionally an organic carrying medium, optionally an organic compound and optionally a surface active compound.

The impregnation slurry of step a) comprises primary particles and secondary particles. The particle size of the secondary particles is larger than the particle size of the primary particles.

The primary particles comprise, preferably consist of, a first polymer. The primary particles either (i) have a particle size equal to or smaller than the average interstitial filament distance, or (ii) have a particle size of 10 to 50 μm, more preferably 15 to 40 μm, even more preferably 20 to 30 μm.

Thus, selecting the appropriate particle size of the primary particles in view of the average interstitial filament distance allows the primary particles to be deposited, or to adhere, between adjacent filaments during impregnation. In other words, the primary particles can penetrate into the impregnated unidirectional fiber layer.

The secondary particles comprise, preferably consist of, a second polymer. The secondary particles either (i) have a particle size larger than the average interstitial filament distance, or (ii) have a particle size of 51 to 500 μm, more preferably 70 to 400 μm, even more preferably 100 to 300 μm.

Selecting the appropriate particle size of the secondary particles in view of the average interstitial filament distance prevents the secondary particles to penetrate between adjacent filaments of the unidirectional fiber layer. The secondary particles remain on a surface of the unidirectional fiber layer. In other words, the secondary particles mostly, preferably only, deposit at a surface or only adhere to a surface of the unidirectional fiber layer.

The particle size is measured by laser diffraction analysis. For the measurement of the particle size the laser diffraction particle size analyser S3500, commercially available from Microtrac, has been used.

Preferably, the impregnation slurry does not comprise primary particles having a particle size larger than the average interstitial filament distance and/or does not comprise secondary particles having a particle size equal than or smaller than the average interstitial filament distance.

Preferably, the impregnation slurry does not comprise primary particles having a particle size larger than 50 μm, larger than 55 μm or larger than 60 μm and/or does not comprise secondary particles having a particle size smaller than 51 μm, or smaller than 45 μm or smaller than 40 μm.

The primary particles and secondary particles can preferably be obtained by grinding the first polymer and second polymer, respectively, and using sieves for obtaining the primary and secondary particles having the desired particle size.

The weight ratio of the primary particles to the secondary particles in the impregnation slurry in step a) is preferably between 90:10 to 70:30, more preferably between 85:15 and 75:25, and most preferably 80:20.

Preferably, the water is deionized water.

Preferably the organic carrying medium comprises an alcohol.

Preferably the organic compound comprises an antifoaming agent.

Preferably the surface active compound comprises a surfactant. The surfactant is preferably a non-ionic surfactant and/or an anionic surfactant. The non-ionic surfactant preferably comprises polyethylene glycol. The anionic surfactant preferably comprises sulfate groups, sulfonate groups, phosphate groups or carboxylate groups.

In step b) the unidirectional fiber layer is impregnated with the impregnation slurry to form an impregnated unidirectional fiber web.

Preferably step b) takes place in an impregnation bath, i.e. a vessel containing the impregnation slurry. The unidirectional fiber layer is impregnated with the impregnation slurry preferably by moving or pulling the unidirectional fiber layer through the impregnation bath. Moving or pulling is preferably done by a gripping or pulling device, for example a rotating mandrel. The gripping or pulling device is usually located downstream of the impregnation bath or impregnation step b). Preferably, the impregnation slurry is agitated during step b).

Impregnation the unidirectional fiber layer with the impregnation slurry in step b) forms an impregnated unidirectional fiber web. The impregnated unidirectional fiber web comprises an impregnated unidirectional fiber layer and a surface polymer layer, the surface polymer layer being adjacent the impregnated unidirectional fiber layer.

The impregnated unidirectional fiber layer comprises, preferably consists of, unidirectional fibers and primary particles. As discussed above, the average particle size of the primary particles is equal to or smaller than the average interstitial filament distance between adjacent filaments of the unidirectional fiber layer. This allows the primary particles to be deposited, or to adhere, between adjacent filaments during impregnation step b). In other words, the primary particles can penetrate into the impregnated unidirectional fiber layer.

The surface polymer layer comprises secondary particles. As discussed above, the particle size of the secondary particles is preferably larger than the average interstitial distance between adjacent unidirectional fibers in the unidirectional fiber layer. Contrary to the primary particles, the secondary particles cannot penetrate into the unidirectional fiber layer but remain on a surface thereof. In other words, the secondary particles only deposit at a surface or only adhere to a surface of the unidirectional fiber layer. The surface polymer layer is thus formed by the secondary particles and, if at all, only by a minor amount of primary particles. Accordingly, the surface polymer layer can also be labelled as "polymer rich layer" or, more precisely, as "second polymer rich layer".

Preferably, there is no other layer located between the impregnated unidirectional fiber layer and the surface polymer layer(s).

The method further comprises the step of drying the impregnated unidirectional fiber web after step b) to obtain a unidirectional tape. Drying can be done in an oven, preferably in an oven comprising infrared heaters. During drying, the water and, if present, the surfactant are evaporated, and the primary particles and the secondary particles in the impregnated unidirectional fiber web are melted.

Preferably, the thickness of the surface polymer layer is between 1 to 15 μm, more preferably between 2 and 10 μm, and most preferably between 4 and 6 μm.

Preferably, the first polymer and/or the second polymer is/are a thermoplastic polymer, more preferably both the first polymer and the second polymer are a thermoplastic polymer.

Preferably, the thermoplastic polymer is a polymer of a class selected from a list of classes, the list of classes consisting of polyaryletherketone (PAEK)-based polymeric material, polyphenylene sulphide (PPS), polyetherimide (PEI), polyethersulfone (PESU, PES) and polysulfone (PSU), more preferably the thermoplastic polymer is a polymer of a class selected from a list of classes, the list of classes consisting of polyaryletherketone (PAEK)-based polymeric material or polyetherimide (PEI).

The polyaryletherketone (PAEK)-based polymeric material is one of the classes of the thermoplastic polymer. Preferably, the polyaryletherketone (PAEK)-based polymeric material is a polymer of a subclass selected from a list of subclasses, the list of subclasses consisting of poly-etherketone (PEK), polyether-ether-ketone (PEEK), poly-ether-ether-ketone-ketone (PEEKK), poly-ether-ether-ketone-ketone (PEKK), poly-ether-ketone-ether-ketone-ketone (PEKEKK), poly-ether-ether-ketone-ether-ketone (PEEKEK), poly-ether-ether-ether-ketone (PEEEK), and poly-ether-diphenyl-ether-ketone (PEDEK), meta-polyether-ether-ketone (PEmEK), polyaryletherketone (PAEK)-based polymeric material with reactive (end) groups, copolymers thereof and blends thereof. More preferably, the polyaryletherketone (PAEK)-based polymeric material is a polymer of a subclass selected from a list of subclasses, the list of subclasses consisting of poly-ether-ether-ketone-ketone (PEKK), and poly-ether-diphenyl-ether-ketone (PEDEK) and copolymers thereof.

Preferably, the first polymer is a polymer of the same class or the same subclass as the second polymer or the first polymer is a polymer of a class or a subclass other than the second polymer.

In case the first polymer is a polymer of the same class or the same subclass as the second polymer, only one class of polymer is present in the impregnated unidirectional fiber web or the unidirectional tape. In case the first polymer is a polymer of the same class or the same subclass as the second polymer, the first polymer preferably differs in weight average molecular weight, branching, optional substituted end-groups and/or copolymer composition from the second polymer.

The advantage of the first polymer being a polymer of a class or a subclass other than the second polymer is that the second polymer forming the surface polymer layer can be specifically chosen.

Preferably, the unidirectional fibers are carbon fibers and/or glass fibers and/or quartz, more preferably are carbon fibers. The unidirectional fibers are preferably continuous fibers, more preferably continuous carbon fibers.

Preferably, in step b) an impregnated unidirectional fiber web comprising an impregnated unidirectional fiber layer and two surface polymer layers is formed, the two polymer layers being located on opposite sides of the impregnated unidirectional fiber layer, wherein the two surface polymer layer comprise secondary particles.

In other words, the impregnated unidirectional fiber layer is sandwiched between two surface polymer layers, both surface polymer layers comprising, or consisting of, second particles. This has the advantage that both surfaces of the UD tape can be tailored and/or functionalised as discussed herein.

As discussed above, the surface polymer layer can be functionalised. Functionalising means that further components are incorporated into the surface polymer layer to provide specific properties to the surface polymer layer. These properties are preferably electrical conductivity or insulating properties. In such a case the surface polymer layer can also be labelled "functionalised surface polymer layer". Such a functionalisation is achieved by adding further components to the secondary particles.

Preferably, the secondary particles further comprise an electrically conductive component, and/or an electrically insulating component.

Preferably, the electrically conductive component is a metal or a carbon-based component. Preferably, the metal is in the form of particles. The size of this metal particles must be smaller than the particle size of the secondary particles. Preferably, the metal is copper and/or bronze and/or the carbon-based component is selected from the group of carbon fibers, carbon black, graphene or mixtures thereof. The electrically conductive component is preferably mixed, more preferably melt mixed, with the secondary particles comprising the second polymer, preferably before step a).

Electrical conductivity of the surface polymer layer is not only advantageous for applications where electrical conductivity is desired, but a high electrical conductivity may be required for possible lightning strikes. In the latter case the electrically conductive surface polymer layer acts as lightning protection.

Preferably, the electrically insulating component are ceramic particles. The size of this ceramic particles must be smaller than the particle size of the secondary particles.

Preferably, the unidirectional fiber layer of step b) further comprises one or more electrically conducting wires on a surface of the unidirectional fiber layer, or one or more electrically conducting wires are introduced into the surface polymer layer after step b). Preferably, the electrically conducting wires are copper wires. The one or more electrically conducting wires can be present or can be laid on a surface or both surfaces of the unidirectional fiber layer. The unidirectional fiber layer together with the one or more electrically conducting wires are then processed starting with step b) of the method.

Alternatively, the one or more electrically conducting wires are preferably introduced into the surface polymer layer after step b). The one or more electrically conducting wires can be laid on one or both surfaces of the impregnated unidirectional fiber layer either after step b) but before step c) or after step c).

The one or more electrically conducting wires can also be introduced after step c) into the surface polymer layer by melting the surface polymer layer, introducing the one or more electrically conducting wires into the melted surface polymer layer and solidifying the surface polymer layer, e.g. by cooling.

Preferably, the method according to the invention further comprises step d) of electrostatically depositing tertiary particles on the surface polymer layer, more preferably electrostatically depositing tertiary particles on both surface polymer layers. Thereby, an additional surface polymer layer comprising or consisting of tertiary particles can be formed on one or both surface polymer layers of the unidirectional tape. In other words, a unidirectional tape with one or two additional surface polymer layers can be obtained. The one or two additional surface layer(s) are preferably the outermost layer(s) of the unidirectional tape. This allows for tailoring and fine tuning the properties of the surface of the UD tape, in particular for specific applications.

Preferably, electrostatic depositing is performed via electro spraying. Electro spraying is preferably done using one or more spraying guns.

Step d) is preferably conducted before step c) or after step c), more preferably after step c). Preferably, the unidirectional tape with one or two additional surface polymer layers is dried or consolidated after step d).

The tertiary particles comprise, preferably consist of, a third polymer. Preferably, the third polymer is/a thermoplastic polymer. The thermoplastic polymer is the same as described herein above for the first and second polymer. Preferably, the third polymer is a polymer of the same class or the same subclass as the first and/or second polymer or the third polymer is a polymer of a class or a subclass other than the first and/or second polymer.

The tertiary particles have a particle size of preferably 10 μm to 500 μm, more preferably 15 to 250 μm, and most preferably 20 to 200 μm. The size of the tertiary particles must be such that they can be electrostatically deposited, more preferably deposited by electro spraying. The particle size is measured by laser diffraction analysis as described above.

The present invention is also concerned with a unidirectional tape obtained by the method according to the invention. All embodiments of the method of the invention as described above are also preferred embodiments of the unidirectional tape obtained by the method according to the invention.

The present invention is also concerned with an impregnated unidirectional fiber web comprising an impregnated unidirectional fiber layer having an average interstitial impregnated filament distance, and a surface polymer layer, characterized in that the impregnated unidirectional fiber layer comprises, preferably consists of, unidirectional fibers and primary particles comprising a first polymer and the surface polymer layer comprising secondary particles comprising a second polymer, wherein either i) the primary particles have a particle size equal to or smaller than the average interstitial impregnated filament distance and the secondary particles have a particle size larger than the average impregnated interstitial filament distance, and/or ii) the primary particles have a particle size of 10 to 50 μm and the secondary particles have a particle size of 51 to 500 μm, All embodiments of the method of the invention as described above are also preferred embodiments of the impregnated unidirectional fiber web, if applicable.

The average impregnated interstitial filament distance between adjacent filaments of the impregnated unidirectional fiber layer is preferably 40 to 60 μm, more preferably 45 to 55 μm, more preferably 47 to 52 μm, more preferably 49 to 51 μm, and most preferably 50 μm.

The average interstitial impregnated filament distance of the impregnated unidirectional fiber layer is measured after impregnating the unidirectional fiber layer.

The average interstitial filament distance can, for example, be determined by an optical microscope. The interstitial impregnated filament distance is measured between adjacent filaments of a fiber at least three times on at least five fibers, and the average interstitial impregnated filament distance is calculated as the arithmetic mean thereof.

Preferably, the first polymer is the same as the second polymer or wherein the first polymer is different from the second polymer. The first polymer and the second polymer are preferably those as described above for the method.

Preferably, the secondary particles further comprise an electrically conductive component, and/or a thermally conductive component, and/or an electrically insulating component.

Preferably, the surface polymer layer further comprises one or more electrically conducting wires. The more electrically conducting wires are preferably copper wires.

The invention claimed is:

1. Method for producing a unidirectional tape, the method comprising the steps of a) providing an impregnation slurry comprising primary particles and secondary particles, water, optionally an organic carrying medium, optionally an organic compound and optionally a surface active compound, and providing a unidirectional fiber layer having an average interstitial filament distance, wherein the primary particles comprise a first polymer and the secondary particles comprise a second polymer, wherein either i) the primary particles have a particle size equal to or smaller than the average interstitial filament distance and the secondary particles have a particle size larger than the average interstitial filament distance, or ii) the primary particles have a particle size of 10 to 50 μm and the secondary particles have a particle size of 100 to 500 μm, and wherein the average interstitial filament distance between adjacent filaments of the unidirectional fiber layer is 40 to 60 μm, b) impregnating the unidirectional fiber layer with the impregnation slurry to form an impregnated unidirectional fiber web comprising an impregnated unidirectional fiber layer and a surface polymer layer, wherein the impregnated unidirectional fiber layer comprises the unidirectional fibers and the primary particles, and the surface polymer layer comprises the secondary particles, c) drying the impregnated unidirectional fiber web to obtain a unidirectional tape.

2. The method according to claim 1, wherein the impregnated unidirectional fiber layer consists of the unidirectional fibers and the primary particles.

3. The method according to claim 1, wherein the first polymer and/or the second polymer is/are a thermoplastic polymer.

4. The method according to claim 3, wherein the thermoplastic polymer is a polymer of a class selected from a list of classes, the list of classes consisting of polyaryletherketone (PAEK)-based polymeric material, polyphenylene sulphide (PPS), polyetherimide (PEI), polyethersulfone (PESLI, PES) and polysulfone (PSU).

5. The method according to claim 4, wherein the polyaryletherketone (PAEK)-based polymeric material is a polymer of a subclass selected from a list of subclasses, the list of subclasses consisting of poly-ether-ketone (PEK), polyether-ether-ketone (PEEK), poly-ether-ether-ketone-ketone (PEEKK), poly-ether-ether-ketone-ketone (PEKK), poly-ether-ketone-ether-ketone-ketone (PEKEKK), poly-ether-ether-ketone-ether-ketone (PEEKEK), poly-ether-ether-ether-ketone (PEEEK), and poly-ether-diphenyl-ether-ketone (PEDEK), meta-polyether-ether-ketone (PEmEK), polyaryletherketone (PAEK)-based polymeric material with reactive (end) groups, copolymers thereof and blends thereof.

6. The method according to claim 4, wherein the first polymer is a polymer of the same class or the same subclass as the second polymer or the first polymer is a polymer of a class or a subclass other than the second polymer.

7. The method according to claim 1, wherein the unidirectional fibers are carbon fibers and/or glass fibers and/or quartz.

8. The method according to claim 1, wherein step b) comprises impregnating a unidirectional fiber layer with the impregnation slurry to form an impregnated unidirectional fiber web comprising an impregnated unidirectional fiber layer and two surface polymer layers, the two surface polymer layers being located on opposite sides of the unidirectional fiber layer, wherein the unidirectional fiber layer comprises unidirectional fibers and primary particles, and the two surface polymer layer comprise secondary particles.

9. The method according to claim 1, wherein the secondary particles further comprise an electrically conductive component, and/or an electrically insulating component.

10. The method according to claim 9, wherein the electrically conductive component is a metal, the metal preferably being copper and/or bronze, and/or a carbon-based component, the carbon-based component being selected from a group of carbon fibers, carbon black, graphene or mixtures thereof, and/or wherein the electrically insulating component are ceramic particles.

11. The method according to claim 1, further comprising step d) of electrostatically depositing tertiary particles on the surface polymer layer.

12. The method according to claim 1, wherein the unidirectional fiber layer of step b) further comprises one or more electrically conducting wires on a surface of the unidirectional fiber layer, or wherein one or more electrically conducting wires are introduced into the surface polymer layer after step b).

13. The method according to claim 8, wherein the unidirectional fiber layer consists of unidirectional fibers and primary particles.

* * * * *